United States Patent [19]
Clinton

[11] 3,792,979
[45] Feb. 19, 1974

[54] FLOATING CHEMICAL TREATMENT DEVICE

[75] Inventor: Harry M. Clinton, Northridge, Calif.

[73] Assignee: Swimrite, Inc., Van Nuys, Calif.

[22] Filed: May 30, 1972

[21] Appl. No.: 257,635

[52] U.S. Cl............ 23/267 A, 210/169, 210/198 R, 210/242, 206/.5
[51] Int. Cl............................................. B01d 11/00
[58] Field of Search....... 23/267 A, 267 E; 137/268; 210/62, 169, 198 R, 242; 206/.5; 239/35

[56] References Cited
UNITED STATES PATENTS
| | | | |
|---|---|---|---|
| 3,598,536 | 8/1971 | Christensen | 210/242 X |
| 3,607,103 | 9/1971 | Kiefer | 210/242 X |

FOREIGN PATENTS OR APPLICATIONS
| | | | |
|---|---|---|---|
| 612,268 | 1/1961 | Canada | 23/267 A |
| 1,164,141 | 9/1969 | Great Britain | 206/.5 |

Primary Examiner—John Adee
Assistant Examiner—Robert H. Spitzer

[57] ABSTRACT

A disposable swimming pool chlorinator in the form of a one-piece, blow-molded plastic container having a relatively large upper end portion defining a flotation chamber, a conically tapered intermediate section, and a depending neck having two rows of vertically spaced, hollow protuberances on its opposite sides and a fill opening in its lower end, closed by a heat-sealed and tearable plug. A charge of chlorine tablets is sealed in the container to fill the latter to above the top of the neck, so that a selected number of the protuberances can be sliced off to form ports for admitting water into and out of the neck while the chlorinator floats in a pool, the container being imperforate above the open ports to trap air therein for flotation purposes and to limit the water level.

7 Claims, 4 Drawing Figures

PATENTED FEB 19 1974　　　　　　　　　　　　　　　　3,792,979
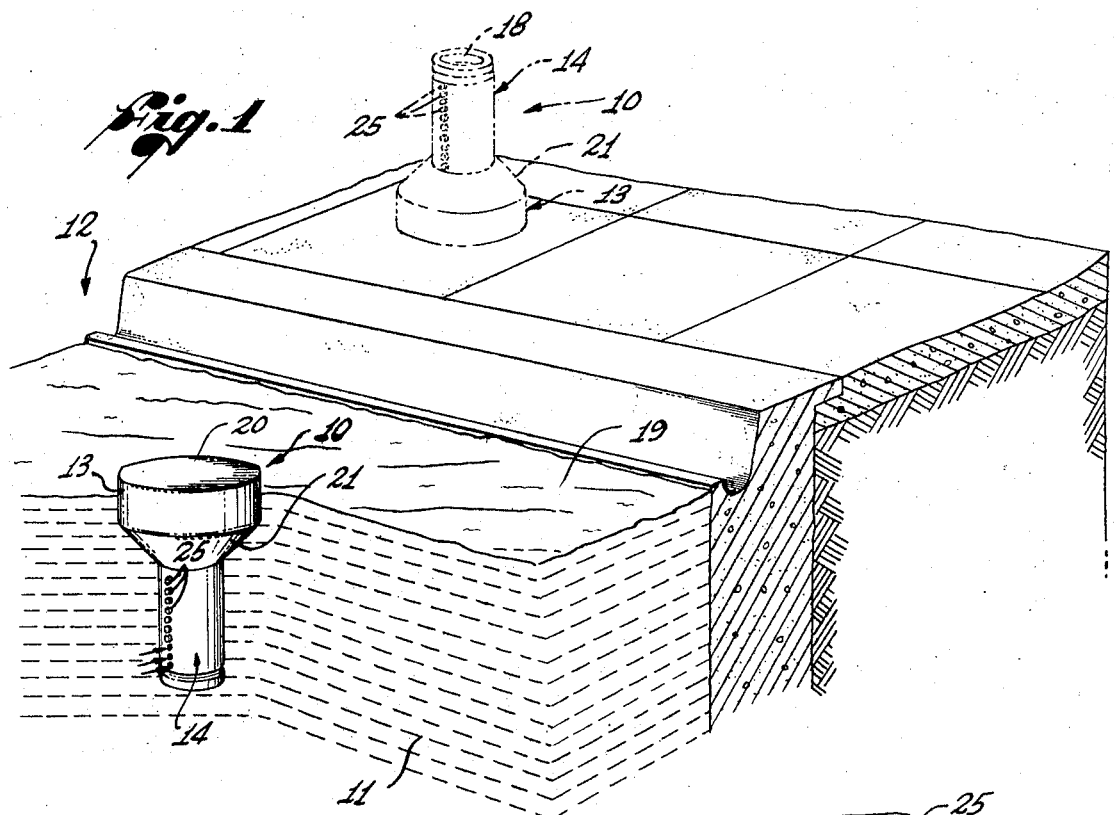
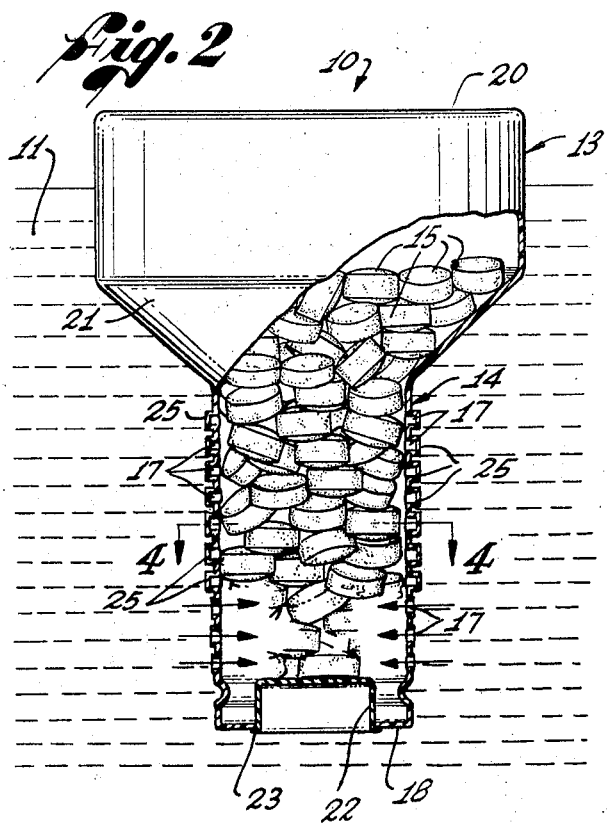
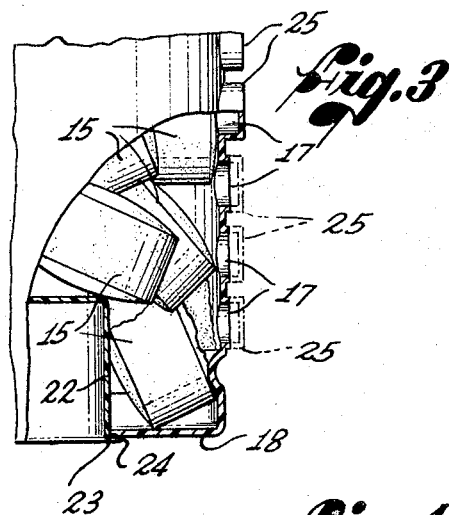
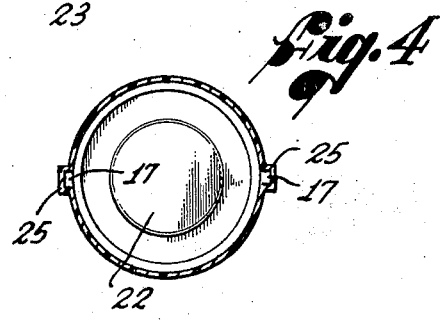

FLOATING CHEMICAL TREATMENT DEVICE

BACKGROUND OF THE INVENTION

This invention relates to the chemical treatment of liquids, and more particularly to the treatment of water in swimming pools and the like with a chemical such as chlorine, to maintain, as closely as practical, a selected concentration of chlorine that is effective to kill bacteria and inhibit growth of organic matter, as well as being safe and comfortable for swimming.

In the past, chlorinization of swimming pools has been accomplished in several ways, including strictly manual treatment performed periodically by the owner or a service man and varied in accordance with the needs of a particular pool, as determined by testing the concentration in the pool. This method is time-consuming, and relatively expensive if handled by a professional.

Efforts have been made to provide automatic devices and systems for introducing chlorine either periodically or continuously at controlled rates, but have not produced a completely satisfactory solution to the problem. One approach has been to incorporate a chlorinization apparatus in the circulation system of the pool, but such an apparatus is inherently relatively expensive, and can malfunction, particularly after prolonged periods of use during which residues from the water and from the source of chlorine, usually tablets, can collect on and jam moving parts.

Another approach has been to place the chlorine tablets in a perforated container, such as a floating capsule or a submerged vessel, to dissolve into the water in the container and be released into the pool through the perforations in the container. Access to submerged containers for servicing is difficult, and the floating containers have had several limitations, including unsightliness, lack of stability, release of chlorine too close to the surface so as to permit excessive escape to atmosphere, difficulties in servicing and handling without leakage, lack of control of the release rate, and others.

Illustrative automatic systems are shown in U.S. Pat. Nos. 3,356,460 and 3,401,116, and illustrative inpool containers are shown in U.S. Pat. Nos. 2,826,484 and 3,390,695. The general objective of the present invention is to provide a chlorinator of the in-pool type which has many important advantages as compared to prior chlorinators of this general type.

SUMMARY OF THE INVENTION

The present invention resides in an improved chemical treatment device that is particularly well-suited for use as a chlorinator in residential swimming pools, and is significantly more convenient to use and effective in operation than prior chlorinators of similar types. Moreover, the device may be mass-produced at relatively low cost so as to be disposable after use, yet provides for continuous chlorinization at rate which are selected in accordance with the chlorine requirements of a particular pool.

More specifically, and as embodied in the preferred mode of the invention shown herein for purposes of illustration, the device is a hollow container, preferably blow-molded of plastic, and has an enlarged imperforate upper end portion defining a sealed flotation chamber, a coaxial neck of reduced size depending from the underside of the upper end portion, at least one, and preferably two, series of vertically spaced, normally closed and selectively openable ports on the neck, beginning near the lower end thereof, and a closed lower end on the neck.

A charge of solid soluble chemical material such as conventional chlorine tablets is sealed in the container to fill the neck to a level above the uppermost of the ports, one or more of the ports are opened adjacent he lower end, according to the chlorine requirements of the pool to be serviced, and the container is placed in the pool to float therein. The wider upper end portion and the weight of the chlorine tablets cooperate to hold the container in an upright position, with the neck extending downwardly into the water, the open ports well below the surface, and a body of gas trapped in the container above the highest open port. This trapped gas provides flotaton, and also limits the water level in the neck to the level of the highest open port, thereby determining the amount of chlorine that is exposed to the water.

To prevent any tablets from being trapped in the enlarged end above the water level, the neck is joined to the enlarged end portion by a downwardly tapered section. This section cooperates with the normal wave action in the pool to funnel fresh tablets downwardly into the neck as other tablets therein are dissolved.

In the preferred form of the container, the ports are defined by two angularly spaced rows of outwardly projecting blisters integral with the neck, which can easily be cut off to open any selected number of ports. Such blisters are easily formed in a blow-molding operation with a selected interior cross-sectional shape and area, so that the cutting-off of a blister produces an open flow port of predictable size.

The initial filling of the container is accomplished through an opening in the lower end of the neck, while the container is in an inverted position. After filling, this opening is closed with a plug, which is securely sealed in the opening to prevent accidental loss of the chlorine tablets. The plug preferably is designed to discourage efforts to refill a container, in view of the possibility of a dangerous chemical reaction between chlorine tablets of different types and brands. For this purpose, the plug is made of relatively light and easily tearable material, such as thin polyethylene, and is in the form of an inverted cup which fits snugly in the opening and has an annular flange overlying, and heat-sealed to, the end of the neck.

Other aspects and advantages of the invention will become apparent from the following detailed description, taken in conjunction with the accompanying drawings.

BRIEF DESCRIPTION OF THE DRAWINGS

FIG. 1 is a perspective view of a portion of a swimming pool, partly in cross-section, with a treatment device embodying the novel features of the present invention floating in the pool water in a normal condition of use, and a second such device, shown in broken lines, resting in an inverted position on the deck of the pool;

FIG. 2 is an enlarged side elevational view of the floating device of FIG. 1, with the neck and part of the enlarged upper end portion shown in cross-section;

FIG. 3 is a further enlarged, fragmentary side elevational view of the lower end portion of the neck, partly in cross-section, with the position of removed blisters shown in broken lines; and FIG. 4 is a cross-sectional view taken substantially along line 4—4 of FIG. 2.

DETAILED DESCRIPTION

As shown in the drawings for purposes of illustration, the invention is embodied in a floating chlorinator 10 for releasing chlorine continuously and at a controlled rate into the water 11 of a swimming pool 12 in which the chlorinator is disposed. In general, the chlorinator is in the form of a hollow container having an imperforate upper end portion 13 in which a body of air is trapped, and a perforated lower end portion 14 in which a charge of chlorine-producing material, such as conventional chlorine tablets 15, is held for dissolving contact with water passing into and out of the container. The combined weight of the chlorinator and the charge therein is less than the weight of the water it displaces, so that it is buoyant and will float in the water in the pool.

In accordance with a primary aspect of the present invention, the upper end portion 13 of the improved chlorinator 10 is an enlarged hollow head, and the lower portion 14 is a neck of reduced size which extends a substantial distance below the head and has at least one, and preferably two, series of vertically spaced, initially closed and selectively openable ports 17 extending from near the lower end 18 of the neck to near the upper end thereof. When a charge of chlorine tablets 15 is in the container, and selected ports 17 are open, the chlorinator floats in the upright attitude shown in FIGS. 1 and 2, and the neck is filled with water to the level of the highest open port. Thus, the amount of chlorine that is exposed to the dissolving action of the water, and the resulting rate of chlorine release, can be determined in advance to suit the capacity of the pool, and the chlorinator floats unobtrusively in the pool in a relatively stable condition while continuously releasing the chlorine well below the surface 19 of the water.

More specifically, the chlorinator 10 preferably is formed as a one-piece plastic, bottle-like container that may be produced inexpensively of relatively heavy-walled linear polyethylene with conventional blow-molding techniques. The container is generally cylindrical adjacent a flat upper end 20, conically tapered at 21 below the cylindrical portion, from the diameter of the cylindrical portion to a substantially reduced diameter, and generally cylindrical from the lower end of the taper 21 to the lower end 18. The upper cylindrical portion and the taper form the hollow head of the container, and the lower cylindrical portion forms the neck 14.

A circular opening is formed in the lower end 18 for use in introducing chlorine tablets 15 into the container, and a plug 22 in the form of an inverted cup is fitted snugly in this opening. The plug has an outwardly turned annular flange 23 (see FIG. 3) around its lower end, overhanging the end 18 of the neck around the fill opening and this flange preferably is permanently sealed to the neck after the container has been filled.

For this purpose, the plug 22 may be made of relatively thin polyethylene and secured to the container by a continuous heat seal 24 between the flange and the lower end. In this manner, removal of the plug and refilling of the container can be discouraged to avoid the danger of a chemical reaction between the initial chlorine tablets used, and tablets of a different type that might be used in refilling the container after most of the initial charge has been dissolved.

Another feature of the invention is the special configuration of the ports 17, for facilitating opening of any selected number in a rapid and simple manner, and also insuring that each such port, when opened, will provide a reasonably predictable flow area for liquid entering and exiting through the ports. To these ends, each of the ports is defined as an internal passage in an outwardly deformed, initially imperforate protuberance or blister 25, which is generally circular in vertical cross-section and has a circular end wall closing the outer end of the internal passage.

The blisters 25 are formed integrally with the remainder of the blow-molded container as an incident to the blow-molding process, and, being deformed out of the sidewall of the neck 14, have walls that are somewhat thinner than the relatively heavy wall of the neck. Thus, any port can be opened by slicing off its outer end with a knife, generally as shown by the three lower blisters on each side in the drawings.

Although a single row of ports 17 on one side of the neck 14 would admit water into the neck, much more effective circulation of water through the chlorine tablets 15 is obtained with more than one row, preferably two, on diametrically opposed sides as shown in FIGS. 2 and 4. The blisters 25 are equally spaced in each row, the lowermost being at a level near the top of the plug 22 and the uppermost near the lower end of the taper 21. Herein, ten are included in each row, and the blisters of the two rows are vertically aligned in pairs and should be opened together.

Indicia may be applied to the neck adjacent each blister, typically in thousands of gallons, to indicate generally the capacity of a pool that should be served if all of the ports from that level down are opened. For example, the second level from the lower end might be marked "10,000 gallons" and each successively higher level marked with a capacity 5,000 gallons larger. Representative dimensions of the container for these capacities would be as follows:

Neck Diameter — About 3½ inches
Neck Length — About 6 inches
Port Diameter — About ¼ inch
Head Diameter — About 8 inches
Head Length (Height) — About 5 inches With such a chlorinator, a charge of about 5 pounds of suitable chlorine tablets can be placed in a container, and will fill the container to about the upper end of the taper 21, as shown in FIG. 2. Although the release rate varies with the number of ports that are opened in use, such a chlorinator can be expected to remain effective, in general, for as long as one month or more.

The manufacture of the improved chlorinator 10 is relatively simple and inexpensive. Containers are mass-produced by conventional blow-molding techniques and the plugs 22 are fabricated from sheet plastic material. Before the plugs are inserted and sealed, a charge of chlorine tablets 15 is introduced through the fill opening while the container is inverted. Then the plug is inserted in the opening, and the flange 23 is heat sealed to the end 18 of the neck 14. It should be noted that the container then is completely sealed to confine the contents therein.

A suitable label (not shown) can be applied, conveniently in the form of a printed paper strip wrapped around the upper cylindrical portion and detachably secured thereto so as to be removable prior to insertion of the chlorinator in a pool. A permanent cautionary notice (not shown), warning against refilling, can be embossed in the upper end 20 of the container. If desired, a tab, ring or the like can be formed on the upper end portion for use in tying the chlorinator in a selected area of the pool.

To prepare the chlorinator 10 for use, a purchaser simply removes the label, and slices off an appropriate number of blisters 25 to open the proper number of ports 17 for the capacity of his particular pool, in accordance with instructions on the label. Three pairs of ports 17 are opened in the illustrative chlorinator shown in the drawings, this being illustrative of a chlorinator appropriate for a 15,000 gallon pool.

Then the chlorinator 10 is placed in the pool with the neck 14 down, as shown in FIGS. 1 and 2, and with the tablets 15 filling the neck and the taper 21, as shown in FIG. 2. This will cause the chlorinator to sink to about the level shown, leaving a relatively narrow portion of the cylindrical portion 13 exposed above the water.

As the chlorinator is inserted in the pool, water enters the neck 14 through the open ports 17 and fills the space around the chlorine tablets in the lower end portion of the neck, up to the level of the uppermost open port. Air is trapped in the container above this level, and thus prevents water from rising above the desired level.

Upon contact with the water, the chlorine tablets 15 begin to dissolve, and chlorine is released into the pool with the water that circulates into and out of the neck. It will be seen that chlorine enters the pool well below the surface, which reduces the immediate loss of chlorine to the atmosphere. It also will be seen that natural wave action in the pool will cause the neck to swing back and forth, pendulum fashion, to enhance the circulation of water through the chlorinator.

As chlorine tablets 15 are dissolved, settling of the tablets will occur, assisted by the wave action to maintain the lower end portion of the neck substantially filled. The taper 21 serves to funnel the tablets from above into the neck, and prevents any tablets from being trapped above the water level.

As the weight of the charge of chlorine tablets 15 is progressively reduced, the chlorinator will rise progressively higher in the water. Thus, the distance it projects out of the water is an indication of the amount of chlorine that has been consumed, and of the useful life remaining. When substantially all of the chlorine has been consumed, the chlorinator will lie over on its side, indicating the need for a fresh unit. Thus, the used unit simply is discarded, and a new unit is prepared for use and placed in the pool.

If an occasion ever arises in which the chlorinator 10 is to be removed temporarily from the pool, it may be raised out of the water, held over the pool while water drains out of the neck 14 through the open ports 17, and then inverted and placed on the deck 27 beside the pool in the position shown in broken lines in FIG. 1. The broad upper end 20 of the container holds the chlorine tablets 15 and any remaining water, and also provides a stable base of support. Since the enlarged upper end portion is imperforate, there is no danger of leakage that could stain the deck.

The generally recommended concentration of chlorine for swimming pools is within the range of 0.6 to 1.0 parts per million, and the foregoing indicia are intended as a general, rather than specific, guide for use in providing the proper concentration. A number of variables affect chlorine comsumption in a swimming pool, including surface area, temperature, agitation and the amount of organic matter present, and testing is advisable at least initially, to determine the actual concentration that is obtained and maintained with a given number of open ports.

From the foregoing, it should be apparent that the present invention provides an improved chlorinator 10 with which chlorine may be introduced into a pool on a continuous basis and at a rate that is suited to the needs of the pool. At the same time, the chlorinator may be sufficiently inexpensive to be disposable, floats in a relatively stable upright position avoiding any likelihood of tipping over, releases chlorine well below the surface 19 of the water, and utilizes the wave action of the pool to enhance the flow of water through the chlorine. The blister-type of port makes the container very simple to prepare for use, and also provides a relatively uniform and predictable flow area when the port is opened. In short, the improved chlorinator is simple, relatively inexpensive, reliable, and convenient to use.

It also will be apparent that, while a particular form has been illustrated and described, various changes and modifications may be made without departing from the spirit and scope of the invention.

I claim:

1. A floating chemical treatment device for use in the continuous chlorinization of a swimming pool, comprising:

a one-piece plastic container having a relatively broad and substantially flat and circular upper end, a cylindrical cpper end portion extending downwardly from said upper end, a downwardly tapered intermediate section below said cylindrical portion, and an elongated, generally cylindrical neck depending from the lower end of said tapered section and substantially coaxial with said cylindrical portion, said neck being longer than said upper end portion and having a fill opening in its lower end.

2. A floating chemical treatment device as defined in claim 1 in which said blisters are circular in vertical cross-section and define ports of predetermined cross-sectional areas when severed.

3. A floating chemical treatment device as defined in claim 1 in which said rows are arranged on diametrically opposed sides of said neck to provide throughflow of water.

4. A floating chemical treatment device as defined in claim 1 in which said cylindrical portion has a diameter at least twice the diameter of said neck.

5. A floating chemical treatment device as defined in claim 1 in which said charge fills said neck and said taper, and extends approximately to the lower end of said cylindrical portion.

6. A floating chemical treatment device as defined in claim 1 in which said plug has an annular flange overhanging said lower end of said neck and permanently sealed thereto.

7. A floating chemical treatment device as defined in claim 6 in which at least said flange is composed of relatively thin-walled, tearable plastic, and is heat-sealed to said lower end sufficiently tightly to cause tearing of said plug during attempted removal thereof.

* * * * *

UNITED STATES PATENT OFFICE
CERTIFICATE OF CORRECTION

Patent No. 3,792,979    Dated February 19, 1974

Inventor(s) Harry M. Clinton

It is certified that error appears in the above-identified patent and that said Letters Patent are hereby corrected as shown below:

Col. 6, line 49, please change the period to a semicolon.

Col. 6, after line 49, please insert the following elements:

--a plug fitted in said fill opening and sealed to said container;

a charge of chlorine-producing tablets sealed in said container and in said neck and extending upwardly into said tapered section;

and two rows of vertically spaced, outwardly projecting hollow blisters on the outer side of said neck and formed integrally therewith, said blisters being arranged in angularly spaced longitudinally aligned pairs of preselected cross-sectional area and composed of material that is easily severed to open selected ports for flows of water into and out of said neck, and said container being imperforate to trap air above said ports for flotation purposes and to limit the level of water in the floating container to the level of the selected open ports.--

Signed and sealed this 3rd day of December 1974.

(SEAL)
Attest:

McCOY M. GIBSON JR.
Attesting Officer

C. MARSHALL DANN
Commissioner of Patents